Sept. 17, 1935. G. M. BELLANCA 2,014,366
AIRPLANE
Filed Oct. 26, 1931
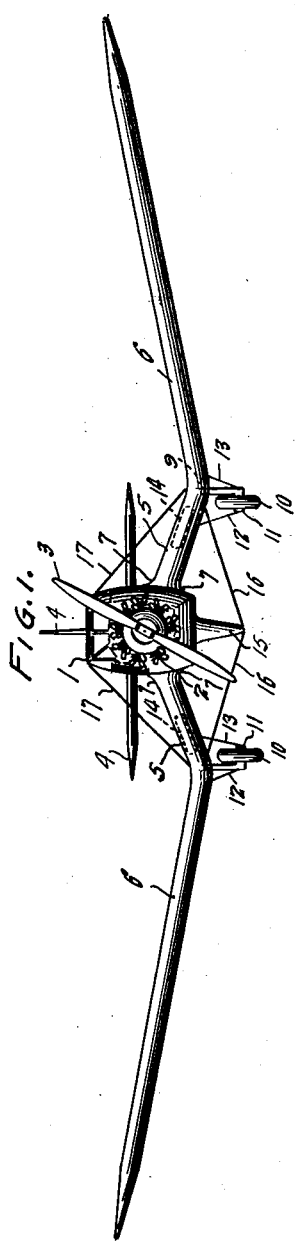
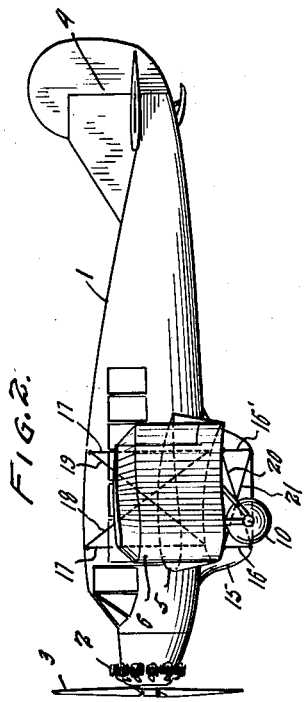
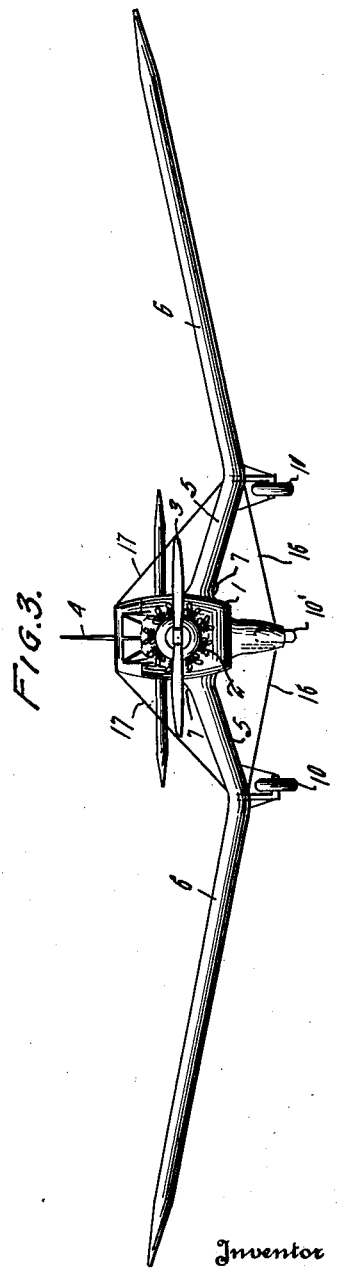
Inventor
GIUSEPPE M. BELLANCA
By Semmes & Semmes
Attorneys Patented Sept. 17, 1935

2,014,366

UNITED STATES PATENT OFFICE 2,014,366

AIRPLANE

Giuseppe M. Bellanca, New Castle, Del.

Application October 26, 1931, Serial No. 571,165

12 Claims. (Cl. 244—12)

This invention relates to an improved airplane.

An object of the invention is to design an airplane which combines the advantages of high speed, inherent stability and easy maneuverability.

Another object of the invention is to provide an airplane with a novel type of landing gear.

Yet another object is to provide a well braced monoplone capable of high speed performance.

A further object is to provide a low wing monoplane having a relatively high center of pressure.

A still further object is to provide an airplane structure with a novel type of cabane strut.

With these and other equally important objects in view the invention resides in the concept of providing a low wing monoplane which is so designed as to present improved lateral stability and in which the landing gear is positioned relatively closely to the wing, while at the same time providing a relatively high center of pressure.

In order to enable a more ready comprehension of the invention typical physical embodiments are shown in the accompanying drawing, in which:

Fig. 1 is a front elevation of the improved airplane.

Fig. 2 is a side view thereof; and

Fig. 3 is a front view of a modification.

As shown in the drawing, the airplane comprises a fuselage 1 in the front end of which is provided a power plant 2 and a tractor propeller 3. In the rear of the fuselage is mounted the empennage structure shown generally at 4.

Preferably the airplane is of the close coupled type so as to provide easy maneuverability with minimum area of control surface. The airplane shown in the drawing is of the closed cabin type but it will be readily comprehended that the fuselage may be of any other design, such for example as the open cockpit type.

As noted hereinbefore, an object of the invention is to provide a low wing monoplane having a relatively high center of lift and in the preferred embodiment the wings are so designed as to bring the center of pressure of the wings up closely adjacent to the center of gravity of the plane. As will be seen particularly in Figs. 1 and 3, this is accomplished by providing a single piece wing having a downwardly extending inner section 5 and an upwardly projecting extension 6. This wing preferably is of the thin section high speed type and is of rugged construction. Such thin section cantilever wing, for example, may have a ratio of camber to chord of approximately 12% and may comprise a section such as Bellanca 4414. Such an airfoil, for example, may have a middle camber line maximum ordinate of 4% of the chord located at 40% of the chord, and a fineness ratio of 14%. It will be observed that the monoplane wing comprises largely the dihedral section 6. The dihedral angle of the wing may of course be varied depending upon the desired compromise between maximum stability and lift and minimum resistance.

The inner wing section 5, near its connection to the fuselage, is preferably filleted, as shown at 7, so as to diminish or minimize interference effects. It will be observed that by extending the inner short section of the wing 5 downwardly and the outer main section of the wing upwardly, as shown, a low wing monoplane structure is obtained while providing a center of pressure which is spaced considerably above the lowermost portion of the wing.

The lowermost section of the wing, that is to say the point 9, can thus be positioned very close to the ground, and considerably closer than any other monoplane structure having a center of pressure which approaches the horizontal position of the center of gravity.

In the preferred embodiment of the invention this depression of a portion of the wing is utilized as the mounting point for the landing gear. It will be observed that this at once presents an opportunity to mount the landing gear very ruggedly on the wing and to considerably shorten the landing wheel struts. In order to secure maximum speed during flight the landing gear is made retractable by utilizing any effective mechanism. As shown in Fig. 2, the landing gear comprises the two landing wheels 10 mounted upon the axles 11 from which an extension or extensions 12 extend upwardly to and are pivoted upon structural elements of the wing, such as the front and/or rear spars. The landing gear mechanism is provided with operating devices, indicated generally by the numerals 12 and 13, for extending the gear into landing position or retracting them within the contour of the wing, as shown by the dotted line position 14. It will be observed, as noted before, that for this type of wing structure the landing gear can be relatively rugged and positioned very closely adjacent the main lift surface.

Another improvement of the invention comprises the rigidification of the wing so as to enable it to withstand the relatively high stresses resulting from high speed flight. As shown in Figs. 1 and 2, a stream lined member 15 extends downwardly from the underside of the fuselage and is effectively stream lined so as to eliminate parasitic resistance. This member, in the airplane shown in Figs. 1 and 2, serves the function of the cabane strut; while in Fig. 3 it serves a double function, as a cabane strut and a mount for the auxiliary or supplemental wheel 10'. To the cabane strut are attached the flying wires 16 extending and connected to the wing surfaces and preferably at or near the lowermost portion, as shown clearly in Fig. 1. As shown in Fig. 2, the lower flying wires may be duplicated so as to provide two wires, 16 and 16', extending from the cabane strut respectively to the front and rear spars of the wing. Preferably the flying wires and the other wiring of the plane are stream lined to diminish parasitic resistance.

The rigidity of the airplane is further enhanced by providing the landing wires 17 connected each at one end to its corresponding wing and at the other end to an upper section of the fuselage. If desired, to further insure the rigidity and immovability of the wing incidence wires 18 and 19 may be provided which are attached to the front and rear wing spars and extend diagonally therefrom to the fuselage in the usual manner. Similar incidence wires 20 and 21 may be provided on the underside of the wing which extend therefrom diagonally to a point of attachment on the cabane strut.

It will be appreciated that this type of structure insures an airplane which is particularly useful in high speed flying, such as for military purposes. The close coupling provides for easy maneuverability with minimum area of control surfaces and hence diminishes resistance. The provision of a low wing monoplane structure having, in fact, a center of pressure corresponding to or approximating a high wing monoplane, brings the center of pressure up coincident with or closely adjacent the center of gravity of the plane and thus insures inherent stability. The utilization of the double dihedral section wing not only provides for effective lateral stability but also permits the utilization of a low position of the landing gear with the minimum length of landing gear strut. In view of the low permissive position of the point of attachment for the landing gear, this structure may be made very rugged to withstand the high stresses necessarily resulting in landing a high speed plane. This is conceived to be a marked improvement, particularly in view of the fact that a large proportion of airplane accidents are due to defective landing gears. The provision of a landing gear which is retractable into the wing minimizes parasitic resistance during flying. It is particularly to be noted that the present structure is particularly suitable for retractable landing wheels in view of the fact that the wing designed provides for a short landing wheel strut and consequently a corresponding rapid movement of the landing wheel from its extended operative position to its retracted inoperative position within the wing.

As shown in Fig. 3, if desired the cabane strut structure may be utilized to perform a double function. To do this the supplemental landing wheel 10' may be mounted on or within the cabane strut. In the preferred modification of the invention this landing wheel is mounted well within the stream line cabane strut so that only a small portion is extended. An advantage of this type of structure is that in the event one of the landing wheels fails to operate, which often occurs, it is still possible for the pilot to ground the plane without particular difficulty or danger due to the fact that the two point support is provided. Furthermore, in the event that both of the retractable landing wheels become inoperative for any reason, a rotating surface is still provided upon which the plane may be balanced. Since this auxiliary wheel is in the center of the machine and since it may be ruggedly mounted, there is little danger of it becoming inoperative. It will be appreciated, of course, that the retractable landing wheels 10 and auxiliary landing wheel 10' may be provided with suitable shock absorbing mechanisms, such as oleo gears and the like.

It will now be observed that an improved airplane has been provided. The plane combines the structural advantages of a low wing monoplane and the aerodynamic advantages of a high wing plane. Furthermore, due to the design of the wing, that is to say due to the lateral dihedral, improved lateral stability is obtained. In addition to the improved lateral stability, resulting from the design of the wing, an improved landing gear is permitted. The plane therefore combines the advantages of improved stability with high speed and safe landing conditions.

While improved modifications of the invention have been described, it is to be understood that these are given merely by way of example and the invention is intended not to be restricted to the specific device as shown, except as such restrictions are clearly imposed by the appended claims.

I claim:
1. A monoplane comprising a fuselage, a wing attached to the fuselage at a bottom portion thereof, the wing having a short span section adjacent the fuselage of negative dihedral and the remaining long wing portion of positive dihedral, and tension means attached respectively to the fuselage and wings to brace the wing.

2. A low wing monoplane, the sustenation surface of which has a short span section of negative dihedral and a longer span continuous section of positive dihedral.

3. A low wing monoplane comprising a fuselage, sustenation surface attached to a lower portion of the fuselage such surfaces having an inner short span wing section of negative dihedral and an outer longer span of positive dihedral, and a landing wheel positioned at the lowermost portion of the wing the said lowermost portion being spaced below a plane including the bottom of the fuselage.

4. A low wing monoplane, each wing of which comprises a short span root section of negative dihedral a portion of which extends below the bottom of the fuselage and an outer section of positive dihedral, the said sections being so designed and arranged that the plane of the center of pressure of the wing is positioned above the transverse plane defining the lowermost section of the wing, and a retractable landing wheel attached to the wing substantially in the said transverse plane.

5. A low wing monoplane, each wing of which has a negative root section and an outer positive dihedral portion, a landing wheel mounted at the intersection of said portions and a third wheel directly mounted on the fuselage between the said wheels.

6. A low wing monoplane comprising a fuselage, sustenation surfaces attached at each side and at the lower portion of the fuselage, each sustenation surface comprising a short span root section of decided negative dihedral and an outer continuous section of positive dihedral so designed that the joint between the positive and negative sections extends below a horizontal plane comprehending the lower portion of the fuselage; the outer portion of the wing having a wing tip positioned vertically above the point of attachment of the root section to the fuselage; retractable landing wheels mounted directly on each wing at the lowermost portion thereof, a cabane strut mounted on the longitudinal axis of the fuselage and extending downwardly therefrom and terminating in a horizontal plane below the horizontal plane including the point of attachment of the retractable landing wheels to the said wings, a non-retractable landing wheel mounted within the cabane strut and largely enclosed thereby; and tension wires attached at one end to the cabane strut and at other ends to the wing structure.

7. A low wing monoplane comprising a fuselage, a cantilever wing attached to the fuselage at a lower portion thereof, the wing having a short span section of negative dihedral adjacent the fuselage and the remaining longer portion of positive dihedral, a cabane strut extending below the fuselage and tension means attached respectively to the wing and cabane strut to brace the wing.

8. A low wing monoplane, the sustenation surface of which has a short span root section of negative dihedral and a longer span continuous section of positive dihedral and a landing wheel mounted at the end of the short span section.

9. A low wing monoplane, each wing of which has a short span root section of negative dihedral and a continuous outer section of positive dihedral, a retractable landing wheel mounted at the end of the short span section, and a non-retractable landing wheel mounted on the fuselage between the said wheels.

10. A low wing monoplane, each wing of which has a short span root section of negative dihedral and a continuous outer section of positive dihedral, a landing wheel mounted at the end of each short span section, a cabane strut positioned substantially on the longitudinal center of the fuselage and extending downwardly therefrom, tension means attached respectively to the strut and wings to brace the wings, and a third landing wheel carried by the cabane strut.

11. A low wing monoplane, each wing of which is of cantilever construction and which also has a short span root section of negative dihedral and a continuous outer section, a landing wheel mounted at the end of each short span section, a cabane strut positioned substantially on the longitudinal center of the fuselage and extending downwardly therefrom, the cabane strut extending forwardly and rearwardly of the center of gravity of the plan, tension means attached respectively to the strut and wings to brace the wings.

12. An airplane comprising a fuselage, a thin section cantilever wing attached to a lower portion of the fuselage to form a low wing monoplane; a cabane strut positioned substantially on the longitudinal center of the fuselage and extending downwardly therefrom and terminating in a horizontal plane below the plane of the wing, and adapted to serve as an emergency landing skid; retractable landing wheels mounted directly on the wing sections, tension means attached at one end to the cabane strut and at the other end to the wings substantially at the area of connection of the landing wheels to the wing, other tension means attached at one end to the fuselage and at the other to the wings at said area, whereby the said tension means serve to brace the landing gear, wing and the cabane skid.

GIUSEPPE M. BELLANCA.